E. A. LELAND.
MULTIFOLD PIPE COUPLING.
No. 186,351.                Patented Jan. 16, 1877.
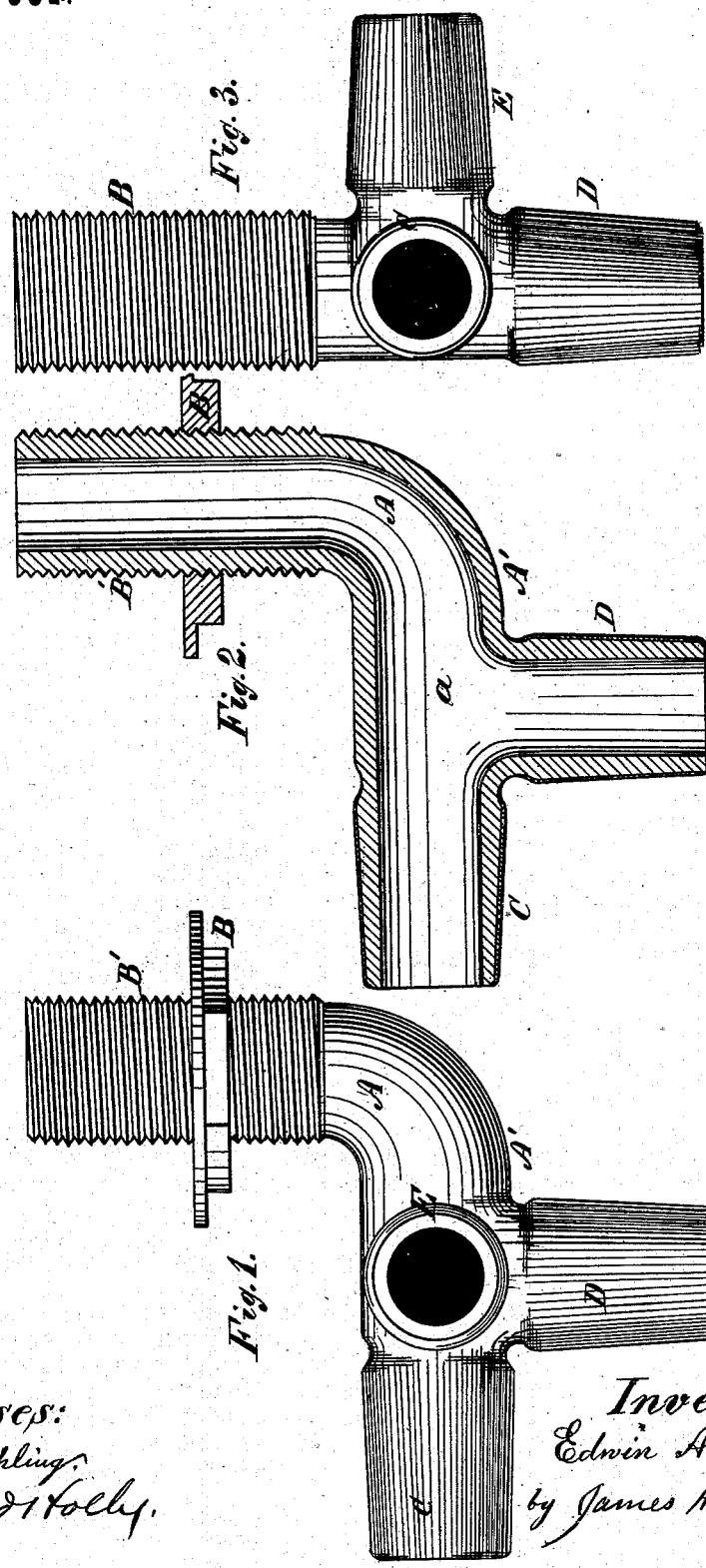
Witnesses:
Henry Eichling.
Edward Holly.
Inventor:
Edwin A. Leland,
by James A. Whitney
Atty.

UNITED STATES PATENT OFFICE.

EDWIN A. LELAND, OF NEW YORK, ASSIGNOR TO LEONARD RICHARDSON, OF BROOKLYN, N. Y.

IMPROVEMENT IN MULTIFOLD PIPE-COUPLINGS.

Specification forming part of Letters Patent No. 186,351, dated January 16, 1877; application filed June 19, 1876.

*To all whom it may concern:*

Be it known that I, EDWIN A. LELAND, of the city, county, and State of New York, have invented an Improvement in Multifold Pipe-Couplings, of which the following is a specification:

The object of this invention is to provide a cheap, simple, and efficient means of connecting a number of pipes diverging in different directions at a point of common junction—as, for example, at the outlet of a sink, or the like—in order to avoid the slow, expensive, and comparatively unreliable method commonly in use of joining the pipes by soldered joints.

To this end the invention comprises a multifold coupling, constructed with a suitable thread and nut for attachment to the sink or other article, in connection with which the device is to be used, and with a number of tinned or galvanized tapering coupling-necks, radiating or projecting in various directions from the body of the coupling, whereby provision is made for the ready soldering of the pipe to the aforesaid coupling-necks, thereby making said pipes continuous with the bore of the body of the coupling, and all having communication therewith, thereby obviating the difficulty hereinbefore referred to of joining the pipes directly to each other at a more or less common place of junction, as has hitherto been the ordinary way.

Figure 1 is a side view of a multifold coupling made according to my invention. Fig. 2 is a longitudinal sectional view of the same. Fig. 3 is an end view of the same, taken in a plane at right angles to Fig. 1.

A is the tubular body of the apparatus, with, preferably, its lower portion A' bent into horizontal form, as represented in Figs. 1 and 2, and its upper portion B' vertical when the apparatus is applied to use—for example, attached to the horizontal bottom of a sink, or the like. This part B' is provided with one or more nuts, B, whereby the part B' may be tightened fast in the bottom of the sink or other article or place to which the coupling may be attached in a manner readily understood by plumbers, and, consequently, needing no specific description here. C, D, and E are what I designate the coupling-necks of the apparatus, these being tapering tubular projections, extending from a point of divergence, a, (more or less common to all,) said coupling-necks projecting in various directions, according to the directions in which the pipes to be attached to the coupling are intended to extend. Each of these coupling-necks is made of tapering form, as represented in the drawings, and is externally tinned, galvanized, or covered with soft metal, capable of taking and holding solder.

The coupling may be made with any desired number of coupling-necks, according to the number of pipes it is desired to attach thereto.

In the use and operation of the invention the coupling, by means of the screw-thread on its part B', is attached to the sink or other article or place whereon or whereat it is to be used. The pipes to be attached to the coupling-necks are enlarged to a tapering form by any suitable means, in such manner that one of the coupling-necks may be thrust into the enlarged and correspondingly-shaped end of the pipe, fitting snugly therein. This done, the end of each pipe is soldered direct to the coupling-neck inserted therein, as just explained, and is thereby firmly and tightly attached to the coupling, the tinned or galvanized surface of the coupling-necks insuring the speedy and effective soldering of the pipes to the necks. By this means any desired number of pipes, having, as it were, a common junction, and extending in any desired direction, may be readily attached to a sink or other article without any of the trouble, expense, danger of accident, or liability of imperfect workmanship very commonly incurred in the practice of joining pipes direct to each other, by soldering, wiping, &c., as is the ordinary method.

What I claim as my invention is—

As a new article of manufacture, the multifold coupling for pipes, constructed with the screw-threaded end B', and the tapering tinned or galvanized coupling-necks C D E, projecting in different directions, substantially as and for the purpose herein set forth.

EDWIN A. LELAND.

Witnesses:
H. WELLS, Jr.,
EDWARD HOLLY.